United States Patent [19]

Capitant et al.

[11] Patent Number: 5,452,018
[45] Date of Patent: Sep. 19, 1995

[54] DIGITAL COLOR CORRECTION SYSTEM HAVING GROSS AND FINE ADJUSTMENT MODES

[75] Inventors: Patrice Capitant, Los Altos; Kathlynn Uenaka, San Jose; John Carlucci, Sunnyvale; David Collier, Gilroy, all of Calif.

[73] Assignee: Sony Electronics Inc., Park Ridge, N.J.

[21] Appl. No.: 290,003

[22] Filed: Aug. 12, 1994

Related U.S. Application Data

[63] Continuation of Ser. No. 48,077, Apr. 14, 1993, abandoned, which is a continuation of Ser. No. 687,962, Apr. 19, 1991, abandoned.

[51] Int. Cl.$^6$ ............................................. H04N 9/64
[52] U.S. Cl. .................................. 348/651; 358/518; 358/520; 348/649
[58] Field of Search ............... 348/651, 649, 655, 675, 348/674; 358/518, 519, 520

[56] References Cited

U.S. PATENT DOCUMENTS 4,679,067 7/1987 Belmares-Sarabia et al.
4,679,074 7/1987 Sugiura et al. ........................ 358/32

Primary Examiner—Curtis Kuntz
Assistant Examiner—Minsun Oh
Attorney, Agent, or Firm—Limbach & Limbach

[57] ABSTRACT

A digital color correction system and method for correcting a color video signal representing a portion of a colored optical image by modifying the entire color space of each of the complementary colors which make up the color signal so that all objects which contain each color are modified at once. A correction means produces an output video signal having a plurality of complementary color components, each of which is related to a corresponding color component of the color video signal by a transfer function, and a modification means for independently modifying each of the transfer functions is provided. The entire color space for each color may be modified, or only selected portions of it. Thus, only objects falling within a desired range of the color space may be selectively modified.

9 Claims, 6 Drawing Sheets

$y = Dx^3 + Cx^2 + Bx + A$ $y = Dx^3 + Cx^2 + Bx + A$

DIGITAL COLOR CORRECTION SYSTEM HAVING GROSS AND FINE ADJUSTMENT MODES

This is a continuation of application Ser. No. 08/048,077, filed on Apr. 14, 1993, now abandoned which is a continuation of Ser. No. 07/687,962 filed on Apr. 19, 1991, (now abandoned).

BACKGROUND OF THE INVENTION

1. Field of the Invention

The present invention relates to color correction systems for video signals, and in particular, to color correction systems in which either an entire color space or particular points in the space may be altered.

2. Description of the Related Art

Color correction systems for selectively correcting electronic signals representing optical images are well known in the art. Various forms of color correctors are used in many sophisticated video systems. In particular, sophisticated color correctors are used in film-to-video conversion systems, such as telecines. In many cases, and particularly in the case of telecines, color correction is needed to overcome color inaccuracies or nonlinearities introduced by the film or by electronic scanning of the optical film images to produce the corresponding video signals.

Color correctors in such systems often require levels of skill beyond the capabilities of operators or editors. Indeed, color correction is often viewed as more art than science. With the growing use of video systems and the corresponding growth in need for editors for such systems, color correctors which require less skill, while providing equivalent if not better color correction, are needed.

A difficult aspect of color correction involves video signal characteristics, such as hue, intensity and saturation. Some color correction systems essentially use a "painting" type of approach, where each object is separately selected and assigned a particular color. Colorization of black and white films often uses this approach. This type of approach is time consuming and difficult, as it does not allow for all objects of a given color to be modified at once, but rather all must be "painted" separately.

Alternatively, some devices allow for changes to the entire color space, i.e. all reds may be altered, or all blues or all greens. However, it is often desireable to alter only those shades of a color falling within a certain range of the color space, and to alter those shades precisely. While some prior art devices can perform such general alterations, the desired precision is not provided for by the prior art devices, other than the "painting" technology above, and in those cases the process again is a long and difficult one.

Another major difficulty facing editors, or "colorists," is that most color correction circuitry in conventional color correction systems is done in an analog fashion, and is thus not very precise or flexible. If adjustments are made to accommodate one particular parameter being corrected, some or all of the other parameters are usually also affected to varying degrees. Some newer, more sophisticated color correction systems, such as special effects machines, do use some digital designs. However, these machines again do not allow for a global modification of a particular part of the color space.

SUMMARY OF THE INVENTION

The present invention provides a digital color correction system and method for correcting a color video signal representing a portion of a colored optical image by modifying the entire color space of each of the complementary colors which make up the color signal so that all objects which contain each color are modified at once.

To accomplish this, the present invention provides for correction means for producing an output video signal having a plurality of complementary color components, each of which is related to a corresponding color component of the color video signal by a transfer function, and modification means for independently modifying each of the transfer functions.

The present invention also provides for modifying either the entire color space for each color, or only selected portions of it. Thus, only objects falling within a desired range of the color space may be selectively modified.

The color correction provided by the present invention can be selectively done on any basis. For example, color correction or encoding can be done on a frame-by-frame or scene-by-scene basis, or even on a field-by-field basis, as desired.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE INVENTION

FIGS. 1 through 6 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The present invention can be embodied within the apparatus disclosed in each of the following copending patent applications, assigned to the assignee of the present application: "Non-Real-Time Film Scanning System," by P. Capitant, D. Hodgson and V. Perry, filed Aug. 7, 1991 (Ser. No. 07/741,329, now patented. "Digital Color Correction System and Method," by P. Capitant, D. Collier and J. Carlucci, filed by Jun. 5, 1991 (Ser. No. 07/710,704, now patented; "Film Scanning Apparatus and Method," by J. Galt, V. Perry, L. Thorpe and D. West on Mar. 29, 1991 (Ser. No. 07/677,578, now patented. The specifications of the foregoing patent applications are incorporated herein by reference.

Figure 1:
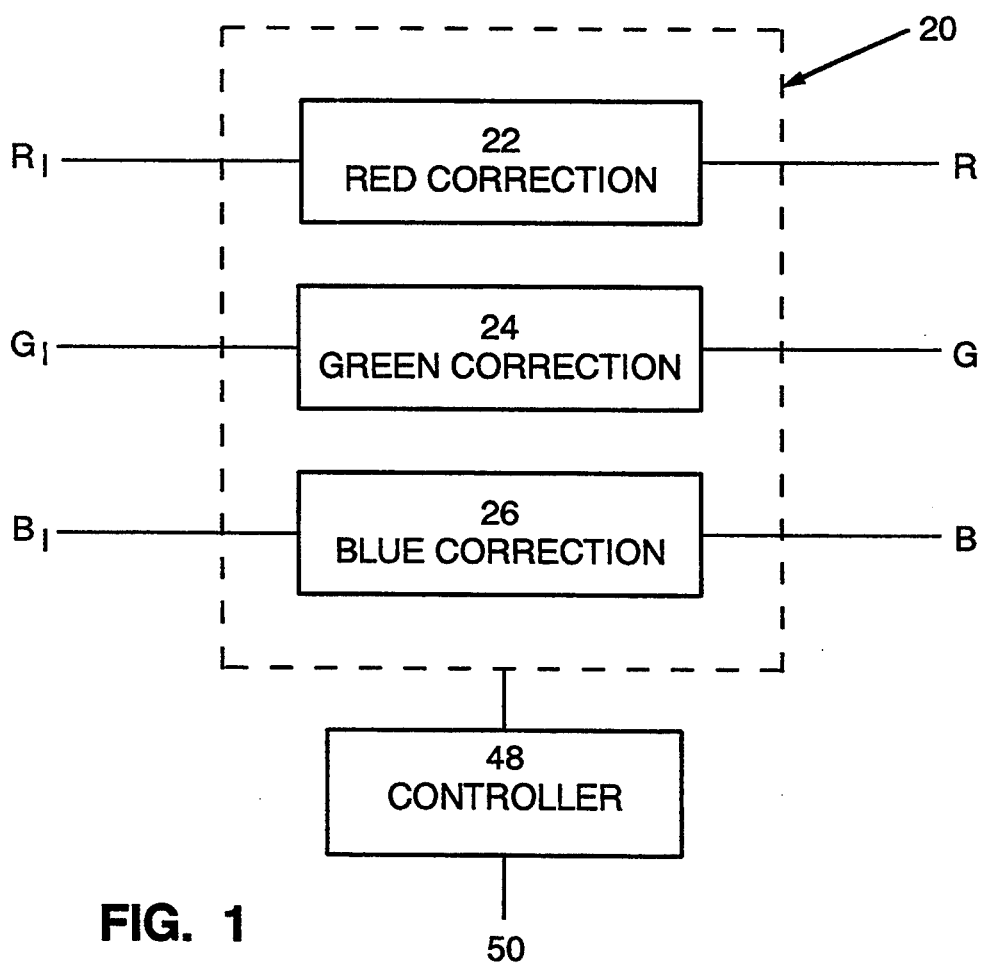
FIG. 1 illustrates a block diagram of a color correction system in accordance with the present invention.

Referring to FIG. 1, a preferred embodiment of a digital color correction system 20 in accordance with the present invention consists of three subsystems 22, 24, and 26, one for each of the three signals corresponding to the three complementary colors, here red, green and blue, necessary to represent a full color signal.

The input signals $R_I$, $G_I$, $B_I$ and output signals R, G, B, as well as the signals in between, are digital with each signal preferably having twelve bits of information. Indeed, it has been suggested that color channels with at least 12 bits should be sufficient to ensure virtually error-free color reproduction, i.e. no visually perceptible quantization errors or anomalies (B. J. Lindbloom, "Accurate Color Reproduction for Computer Graphics Applications," Computer Graphics, Vol. 23, No. 3, Jul. 1989).

However, it should be understood that this example of 12 signal bits is merely exemplary and that, in accordance with the present invention, fewer or greater numbers of signal bits can be used, depending upon the desired resolution or accuracy. For example, while 12 bit A/D and D/A converters are available, they are still relatively expensive and too slow for practical use. On the other hand, 10 bit converters are inexpensive and readily available but do not provide the same level of resolution. A system using as few as 8 bits can be implemented, with a logarithmic stretch to compensate for the use of fewer bits, but this can introduce additional noise into the process. It should be further understood that as technology economically allows, even a greater number of bits, for example 14, 16 or more, may be more desirable.

Each of the functions performed within the system as described more fully below, is performed in a digital and synchronous manner. In other words, each twelve bit signal is processed digitally and synchronously.

Throughout FIG. 1 and the following discussion, several corresponding functional elements are referred to with like numerical designators having "R" "G" or "B" suffixes. The use of these suffixes is intended to indicate that those corresponding elements perform similar functions for their respective film or video color signals (e.g. red, green and blue).

Further, the following discussion refers to the color signals as corresponding to red, green and blue. However, it is understood that other complementary color combinations can be used, as desired. For example, the color trio of cyan, magenta and yellow can be used with equal effectiveness. Also, one could use $P_R$, $P_B$, and Y, where $P_R = R - Y$
$P_B = B - Y$
$Y = $ Luminance Providing for the selective use of alternative color trios (e.g. red, green and blue, or alternatively cyan, magenta and yellow) is within the scope of the present invention and can be quite desirable to allow for the processing of either positive or negative images.

It should be further understood that the signal and interface lines discussed below can be provided and operated in either serial or parallel protocols, as desired. However, for maximum processing speeds, most if not all signals should preferably have their respective bits transferred or processed in parallel.

The input signals $R_I$, $G_I$, $B_I$ are twelve bit digital signals representing red, green and blue film color signals, which in turn represent red, green and blue colored optical film images, respectively. These can be normalized to some standard, for example to correct for camera or film characteristics, or may even be already altered for artistic purposes, as shown in the copending application of the assignee of the present invention "Digital Color Correction System and Method," by P. Capitant, D. Collier and J. Carlucci, filed by Jun. 5, 1991 (Ser. No. 07/710,704, now patented. Correction for camera or film characteristics, and artistic color correction in several prior art devices, is generally done using the logarithms of the color signals, in what is sometimes called the film domain, because the response of developed film dyes to light is easily expressed using logarithms.

Also as shown in the above-referenced copending application, it is possible to correct the color signal for the expected crosstalk effects of the display device prior to the color correction of the present invention.

The system of FIG. 1 subjects each of the three signals corresponding to the three complementary colors which comprise a color signal to a transfer function, so that the output signal for that color is related to the input signal by the transfer function. The three transfer functions are independent of one another so that each of the complementary colors may be corrected separately from the other two.

Figure 1A:
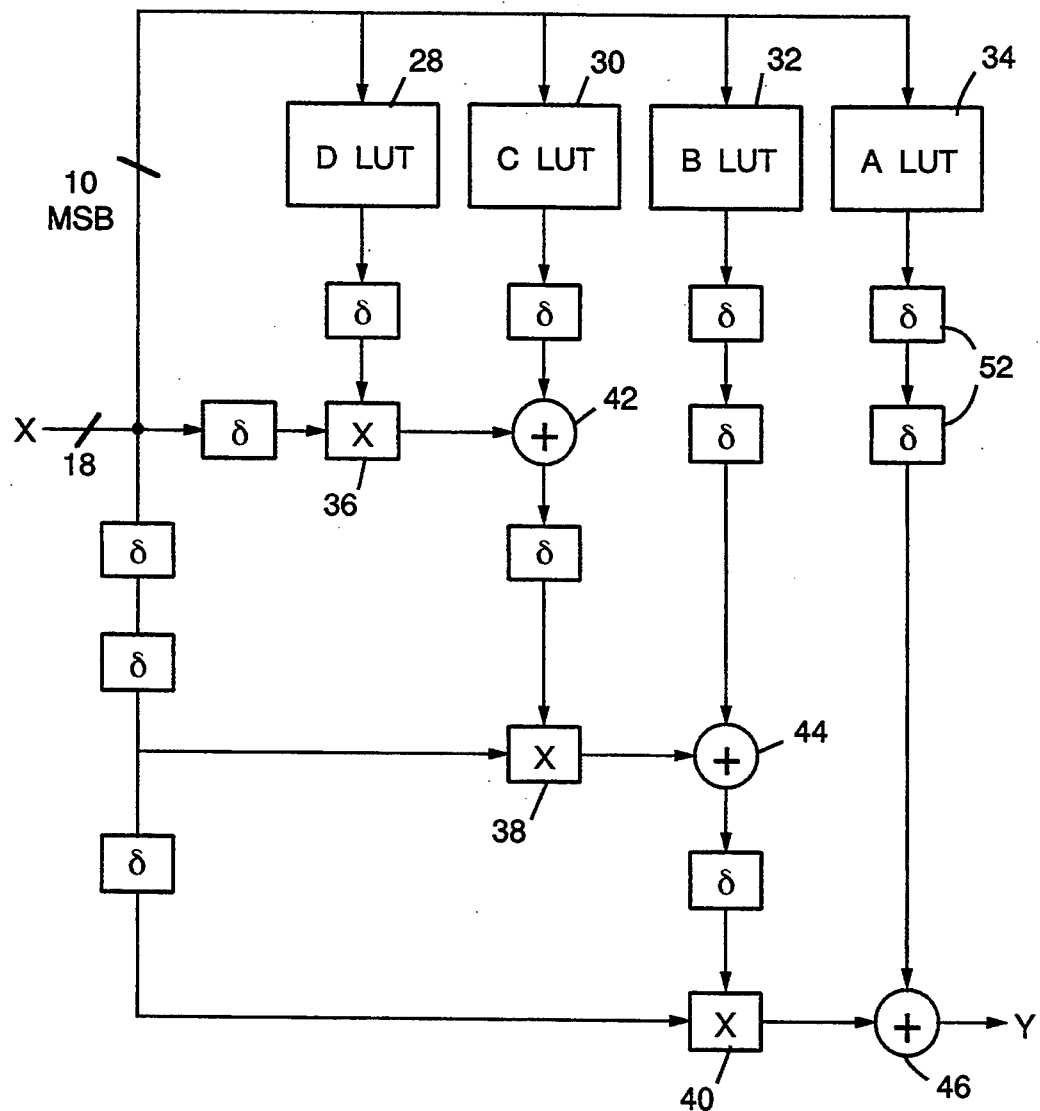
FIG. 1A illustrates a block diagram of one subsystem of the color correction system of FIG. 1.

FIG. 1A illustrates, for example, red subsystem 22. As shown, the subsystem 22 is comprised of four look-up tables 28, 30, 32 and 34, multipliers 36, 38 and 40, delay circuits 52, and adders 42, 44 and 46. A controller 48 is used to modify the look-up tables as discussed below, based upon input from the user through user interface 50. The subsystem takes the input signal X and outputs a signal Y which is related to the input signal X, in a given interval, as $$Y = DX^3 + CX^2 + BX + A$$

The input signal X acts as an address, which accesses the four look-up tables 28, 30, 32 and 34. For each input, or address, there is a corresponding value of A, B, C and D. Through the multipliers 36, 38 and 40, delay circuits 52, and the adders 42, 44 and 46, the subsystem generates an output signal Y according to the above equation.

For reasons discussed below, the look-up tables allow the values of the coefficients A, B, C and D to vary across the range of the input signal X so that the resulting equation for the output signal Y is not the same for all input values. Instead, the color space is broken into intervals, each of which may have a different set of coefficients. Thus, one interval may have a set of coefficients $A_1$, $B_1$, $C_1$ and $D_1$, while in the adjacent interval the coefficients may be $A_2$, $B_2$, $C_2$ and $D_2$. The controller 48 modifies the values in the look-up tables 28, 30, 32 and 34 based upon input from user interface 50 as explained below.

Figure 2:
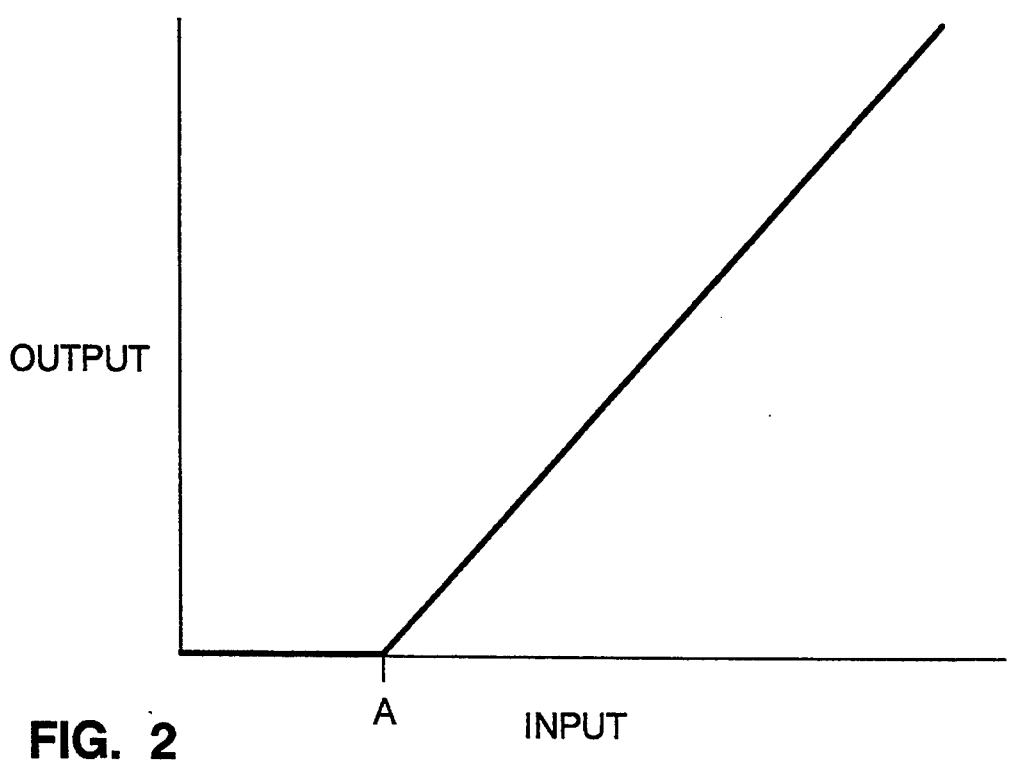
FIG. 2 illustrates a graph of the transfer function, i.e. input versus output, of the color correction system of the present invention in the default condition.

FIG. 2 shows a graph of one possible transfer function of the subsystem of FIG. 1A for one of the three complementary colors, that is, what the output of the subsystem for that color is for any given input of that color. In the preferred embodiment, this transfer function is the default condition, although another transfer function may be selected as the default condition. In the default condition of the preferred embodiment, the output is directly proportional to the input, the ratio being the gain of the system. In the graph of FIG. 2, a bias is added, so that the input must be over a certain level A before there is any output.

The transfer function of FIG. 2 may thus be shown as:

Output=(gain * input)+bias $$Y=BX+A$$

In other words, in the default condition C and D are zero. If the output signal is desired to be identical to the input signal, then the gain B is set to one and the bias A is also set to zero. In this situation, $Y=X$.

Again, the system of FIG. 1 has three separate transfer functions, one given by each subsystem 22, 24 and 26 for each of the complementary colors used, here red, green and blue. The transfer function for one color need not be the same as the transfer function for another color. Thus, in the default condition of FIG. 2, the values of B and A may differ for the red, green and blue signals, and may be differentiated as $B_R$, $B_G$ and $B_B$, and $A_R$, $A_G$ and $A_B$.

Figure 3:
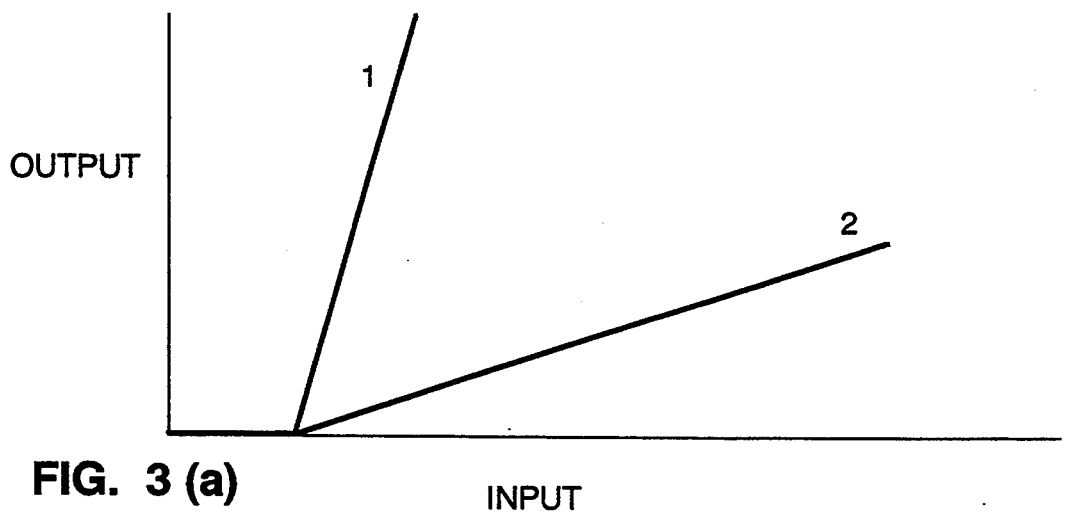
FIG. 3 illustrates graphs of various types of global changes which may be made to the transfer function of FIG. 2.
Figure 3:
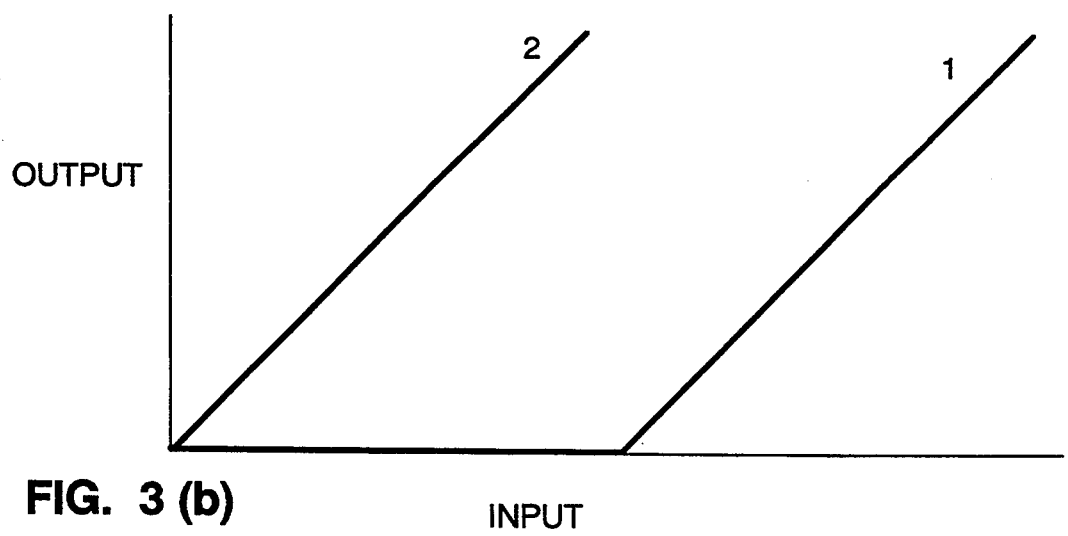
Figure 3:
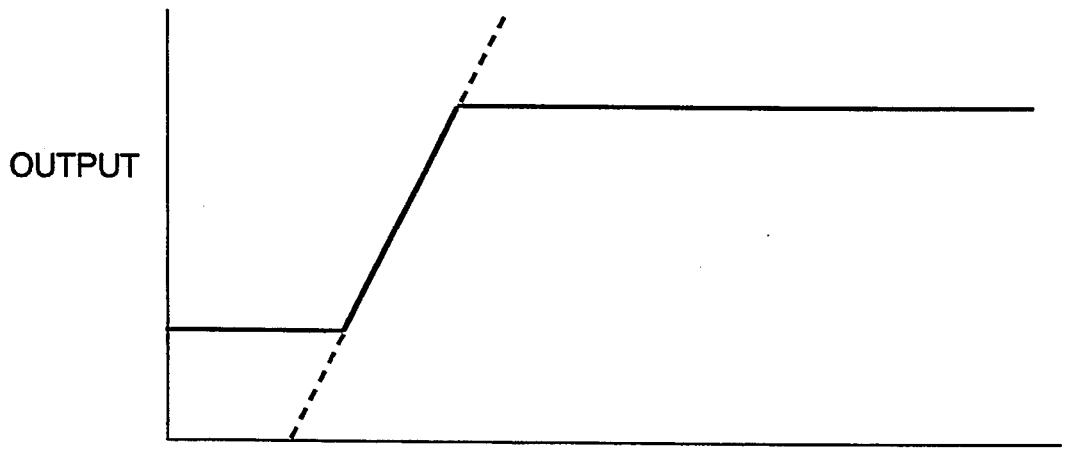

FIGS. 3 (a)-(c) show several types of global changes which can be made to the transfer function of FIG. 2. In FIG. 3(a) the gain A has been changed, thus changing the proportion between the output and the input, in case 1 increased and in case 2 decreased. In FIG. 3(b) the bias has been changed, again in case 1 increased and in case 2 decreased. FIG. 3(c) shows a different kind of change, that of limiting the bandwidth of the signal so that there is a minimum and a maximum output. This causes the output signal to be clipped to these limits, which can be useful in reducing reflections and highlights while preserving overall contrast. Again these changes may be made independently for each of the complementary color signals.

These global changes to the three complementary color signals are easily implemented. A small look-up table containing the values of the gain B and the bias A, and a means for altering the values in the table as desired, along with a filter if clipping is desired, is sufficient for this purpose. In fact, no look-up table is even needed if there is a user input for the gain.

However, it is often desireable to be able to modify the color signal within only a certain range of inputs. The present invention provides for this by allowing the user to modify the values of coefficients A, B, C and D for different input values.

Figure 4:
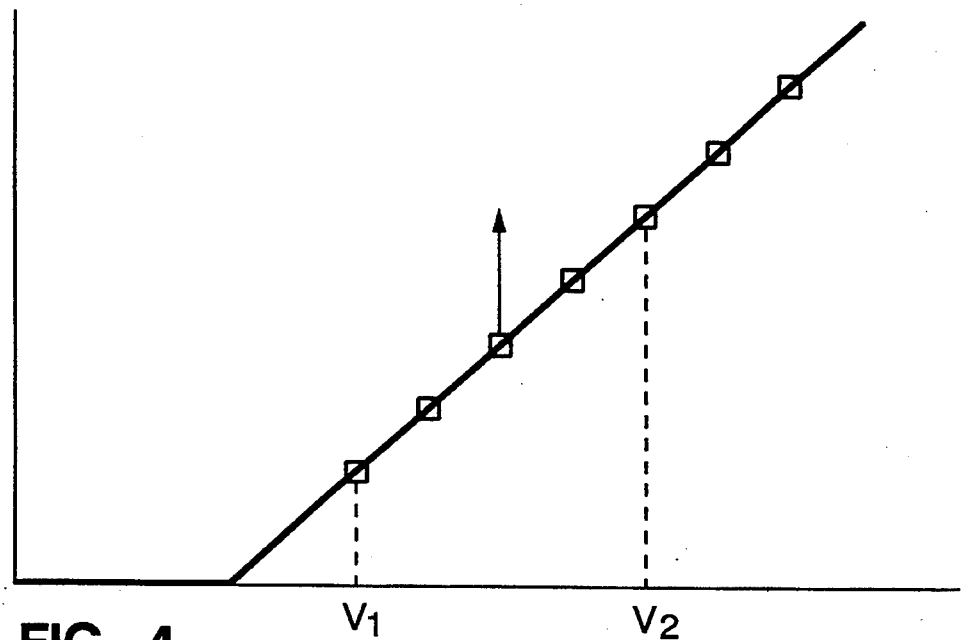
FIG. 4 illustrates a user interface for making a local change to the transfer function of FIG. 2 in the preferred embodiment of the present invention.

In the preferred embodiment, the user sees a graph of the transfer function, such as the default condition of FIG. 2, with "control points" imposed on it, as shown in FIG. 4. The user points to one of the control points with a pointing device such as a mouse or trackball, and moves it vertically to set another output for the corresponding input, as shown by the arrow in FIG. 4. In the preferred embodiment the number of control points is kept to a number which can be easily handled, such as 5 to 8, and points in between the control points are interpolated. In the preferred embodiment, the user can add additional control points as desired to break the transfer function into smaller segments and make the effect of each move of a control point more localized. (While it is theoretically possible for the user to independently set or modify all 4096 points of the transfer function, as a practical matter this would be difficult, as well as tedious. This may also limit the number of control points which can be added. Further, available monitors do not have the resolution to display all 4096 points, although some programs allow the user to display an approximation of the entire curve and then zoom in on the desired portion.)

To interpolate, the curve at any particular point is locally approximated by a cubic equation of the form $$Y=DX^3+CX^2+BX+A$$

where Y is the output and X is the input, as above. This is the reason for the specific configuration of the subsystems 22, 24 and 26, each of which generates a set cubic equations, one for each interval between two adjacent control points. (As above, the straight line transfer function of FIG. 2 is a form of this in which D and C are both zero.)

Figure 5:
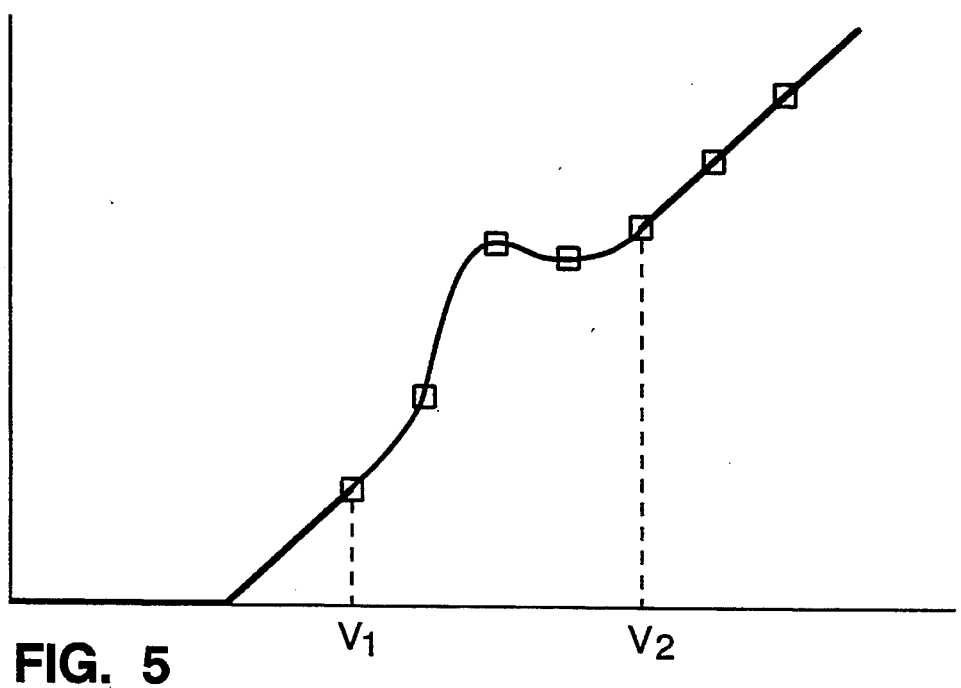
FIG. 5 illustrates how the transfer function is modified with the interface of FIG. 4.

In non-mathematical terms, when a control point is moved, as shown in FIG. 4, the represented point of the transfer function and several points around it are used to establish a cubic equation for the regions on either side of the moved control point, and the values in the look-up table are altered to fit that equation within the range of inputs for which the transfer function is altered by the movement of the control point. FIG. 5 shows the change to the transfer function which results from the movement of the control point shown in FIG. 4. The dashed line is the original straight line transfer function.

It would also be possible to implement this by having a micro-processor calculate the resulting values of all 4096 points and using large look-up tables which actually specify the output for each input. Each transfer function would then be represented by 4096 points, one for each possible input. The desired output value for each possible input value could then be inserted into the look-up table, and no multipliers or adders would be necessary.

However, this approach suffers from two problems. First, it requires three look-up tables each having 4096 entries, and each entry must be large enough to contain the desired output signal, presumably of the same length as the input signal (here 12 bits). This requires a significant amount of memory. More importantly, the time to download the look-up tables becomes more significant the larger the tables are. (This may be particularly significant where the present invention is used in combination with a color processor such as that shown in the copending application of the assignee of the present invention "Digital Color Correction System and Method," by P. Capitant, D. Collier and J. Carlucci, filed by Jun. 5, 1991 (Ser. No. 07/710,704) now patented, in which as many as 18 bits are desired to allow for full resolution of the more sensitive logarithmic scale of the "film domain." With 18 bits, there can be 262,144 entries in each table and the time for downloading becomes a significant problem.)

Thus, it is desireable to reduce both the size of the look-up tables and the number of points which need to be set by the user. It is also desireable for the appearance of the color signal that there be continuity of the transfer function between adjacent points of input.

Thus, using cubic equations to determine the transfer function between the control points serves to reduce the size of the look-up tables since they need include only the coefficients to be used in determining the output signal, rather than the output signal itself, which are then fed to a circuit such as that shown in FIG. 1A to calculate the output signal.

When this is done, the look-up tables now contain values for coefficients A, B, C and D which vary with the intervals between the control points. For example, in FIG. 5, the transfer function remains unaltered when the input is less than $V_1$ or greater than $V_2$, so that the output is still a straight line outside of that range. Thus, A and B are unchanged and C and D are still zero for such inputs. However, when the input signal is between $V_1$ and $V_2$, A and B change and C and D are no longer zero, so that a cubic equation is generated for inputs in this range. Thus, the look-up tables contain fewer entries than the number of points are desired to represent the transfer function. (Additional storage must be provided to allow for the entry of additional control points.) The value of each specific input is calculated by a microprocessor on a real time basis, based upon the resulting cubic equations.

In the preferred embodiment, the interpolation of the curve between the control points is accomplished by a known mathematical technique of estimating curves known as a C-spline. In this technique, in mathematical terms, a point on the T-spline is defined as $$X(s) = S(s) \cdot G \cdot P$$

where $X(s) = [x(s), y(s)]$
are the coordinates of spline curve point $S(s) = [s3, s2, s1, s0]$
is the parameter vector, $s\epsilon[0, 1]$ $$P \begin{bmatrix} x_{n-2} & y_{n-2} \\ x_{n-1} & y_{n-1} \\ x_n & y_n \\ x_{n+1} & y_{n+1} \end{bmatrix}$$

is the knot vector of four defining points and $$G = \begin{bmatrix} (b-1)t & 2-bt & (1-b)t2 & bt \\ 2(1-b)t & (3b-1)t-3 & 3-t & -bt \\ (b-1)t & (1-2b)t & bt & 0 \\ 0 & 1 & 0 & 0 \end{bmatrix}$$

is the $\tau$-spline basis matrix where $b$ is the bias and $t$ the tension of the curve with $t$, $b\epsilon[0, 1]$ The $\tau$-spline with a bias of 0.5 is the Cardinal spline. A bias and tension of 0.5 yields the Catmull-Rom spline.

The spline interpolation curve is then drawn between $\{x_{n-1}, y_{n-1}\}$ and $\{x_n, y_n\}$. Note that any added point needs to be supplemented by three other points for a complete knot vector. The other points will be selected in the following manner.

An elasticity coefficient will be used to define the 'arc' distance between the added knot and the base knots. Because the default curve is a straight line, the actual distance parameter used is the x coordinate offset. If $\{x_n, y_n\}$ are the coordinates of the added knot, then $$x_{n-1} = x_n - \epsilon, \ y_{n-1} = g(x_{n-1})$$

$$x_{n+1} = x_n + \epsilon, \ y_{n+1} = g(x_{n+1})$$

where $y = g(x)$ is the existing linear curve, $\{x_{n-1}, y_{n-1}\}$ is the left adjacent knot, $\{x_{n+1}, y_{n+1}\}$ is the right adjacent knot and e is the elasticity measure. If any previous knot can be found between the added knot and the adjacent knots defined above it becomes the new adjacent knot. The two extra knots needed, $\{x_{n-2}, y_{n-2}\}$ and $\{x_{n+2}, y_{n+2}\}$ are the next knot (or end point) encountered left and right, respectively, of the adjacent knots. In addition, because a new point was added, the curves between $$\{x_{n-2}, y_{n-2}\} \rightarrow \{x_{n-1}, y_{n-1}\}$$

and $$\{x_{n+1}, y_{n+1}\} \rightarrow \{x_{n+2}, y_{n+2}\}$$

have to be redrawn using $\{x_n, y_n\}$ as a new knot point.

Figure 6:
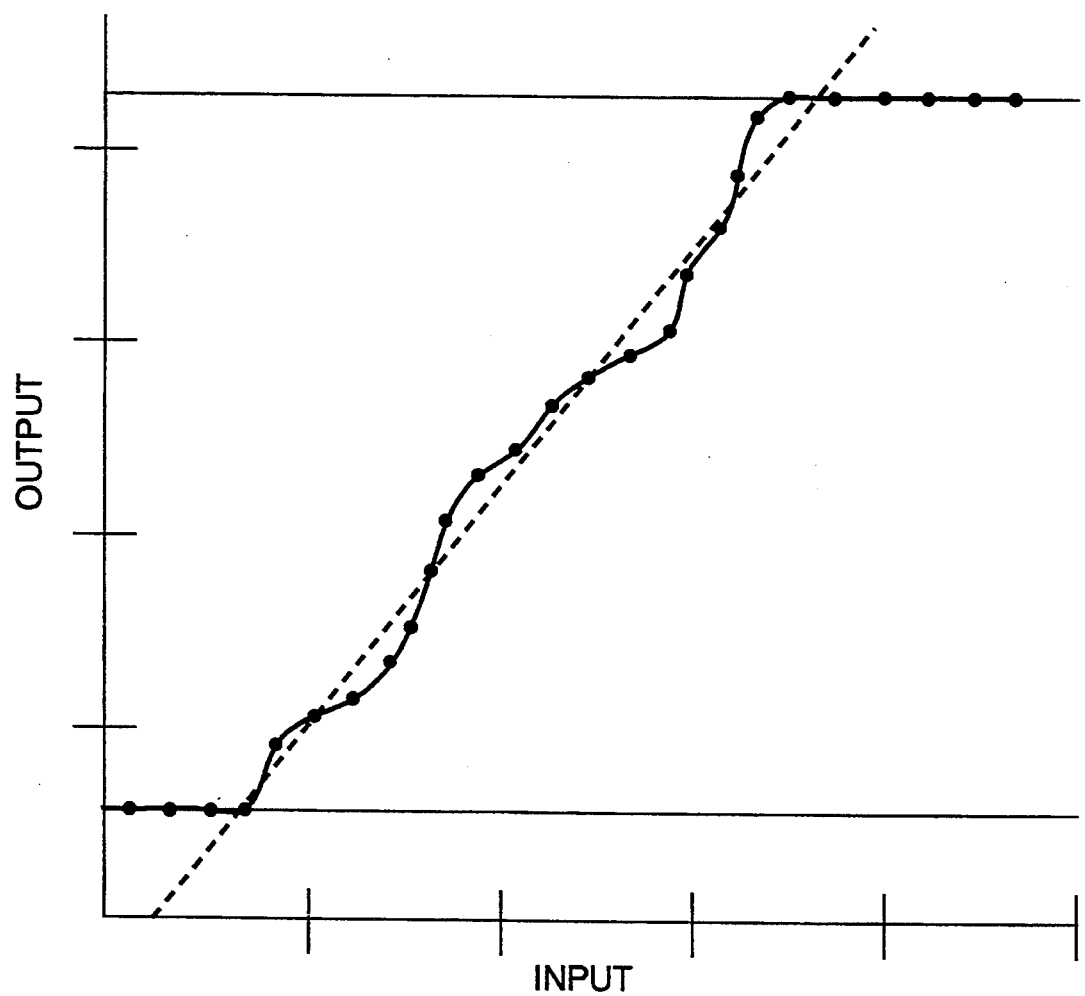
FIG. 6 illustrates a transfer function after a number of modifications.

Each movement of a control point creates a similar change in the transfer function, so that virtually any curve may be created, such as that shown in FIG. 6, and the appropriate values of the transfer function between the control points determined by the coefficients in the look-up tables which are in turn set by the spline interpolation between the control points.

Another feature of the preferred embodiment is the ability to match colors, i.e. to select a particular color in a video signal being processed and change it to match a reference color. If the reference color is in another video signal, it is relatively easy to implement this by looking at the values of R', G' and B' in the selected color in the reference signal and adjusting the transfer functions of the three color spaces R, G and B such that the outputs for the inputs which create the color in the signal being processed change to create the desired color.

However, it is often desireable to match a color which is not provided by another video signal. Most often this is done with reference to a color wheel, in the HSV, or hue saturation and value, domain, a format with which many users are familiar. One implementation of such a color wheel is shown in FIG. 7.

Color wheels in general are well known. The wheel may be thought of as an inverted cone. The inverted pyramid in the lower left of FIG. 7 represents a vertical cross section of the cone. The vertical axis is value, or the amount of black in the color. Thus, at the bottom of the pyramid the signal is all black. The horizontal axis is saturation, or the amount of white in the color. In the center, there is no color so the signal contains only black and white, and thus a line up the center of the pyramid is a grey scale. As one moves to the sides of the pyramid color is added so that close to the center the color is pastel and toward the edges the color becomes intense.

Figure 7:
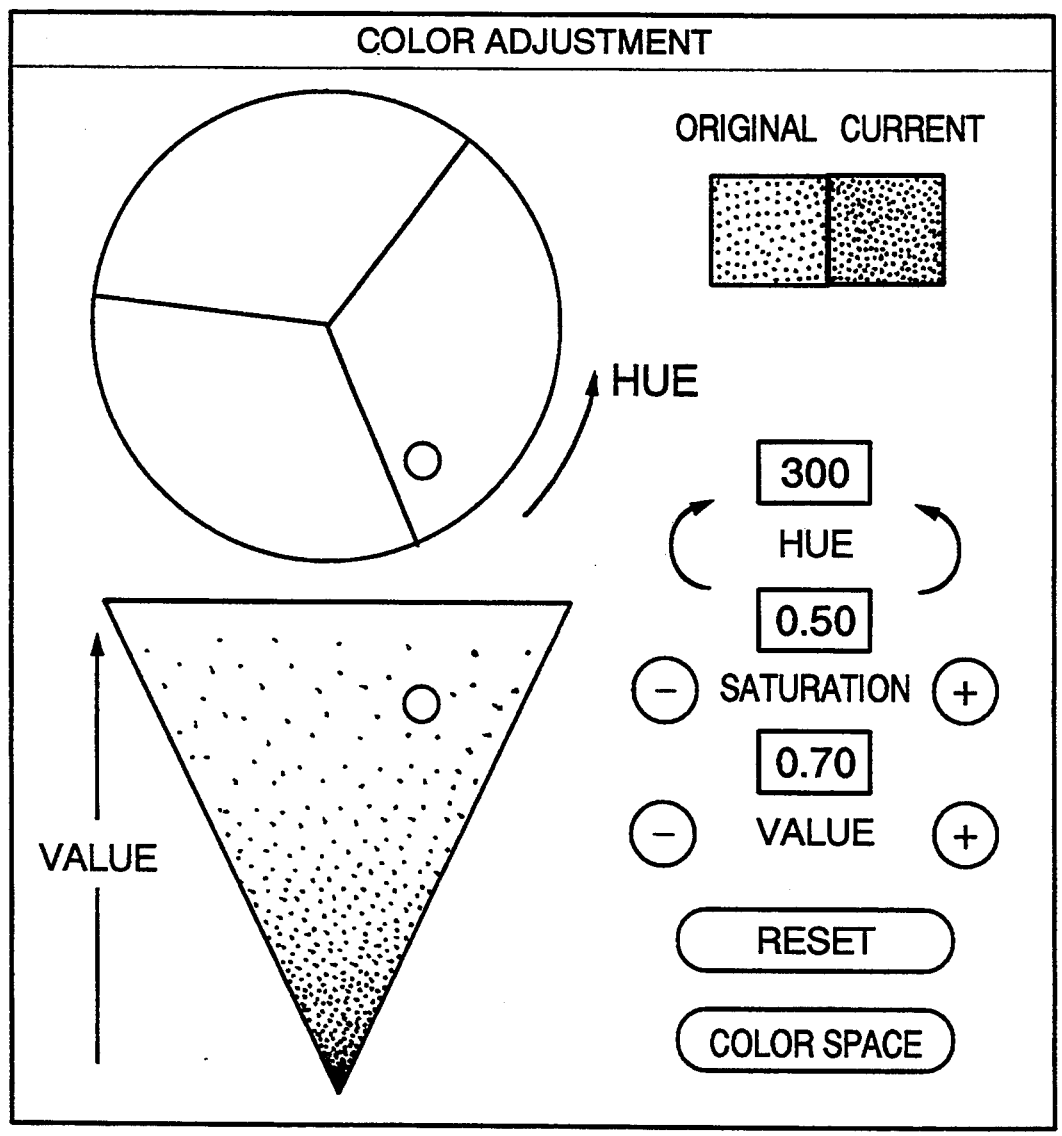
FIG. 7 illustrates a color wheel in the HSV (hue, saturation and value) domain.

The wheel in the upper left of FIG. 7 is a horizontal cross section of the cone. At the center the signal is grey. As one moves radially away from the center color is added, i.e. saturation, so that near the center it is again a pastel and toward the circumference it is very intense.

The circumference of the circle is hue, so that the color changes as one moves around the circle.

In the typical user interface, the user changes the selected color by moving two pointers, the little circle in the wheel and the little circle in the pyramid, for example with a mouse or other pointing device. Note that saturation may be changed in either place, while hue and value must be changed on the proper part of the screen, either the wheel or the pyramid respectively.

The particular implementation shown also includes numerical values, so that a desired color, once found, can be recreated at will, and a box in the upper right corner in which an original color can be compared to the color represented by the current location of the pointers. One use of this is to choose a color in the video signal being processed which is desired to be changed. This is stored in the "original" box, and the pointers will adjust to show the hue, saturation and value of that color. The user can then move the pointers and see the newly chosen color in the "current" box.

When a desired color is found, if the user wishes to change the original color to the current color, the "Reset" button is selected by the mouse or other pointing device. This resets the original color to the color in the current box, which is represented by the pointers on the wheel and the pyramid. To accomplish this, the system translates the values of hue, saturation and value for the chosen color into values R', G' and B' and, as above, adjusts the transfer functions of the three color spaces R, G and B such that the outputs for the inputs which create the original color in the signal being processed change to those required to create the desired color. The values of R', G' and B' which correspond to the hue, saturation and value (H, S and V) of the selected color are determined as follows:

$H \in [0,360], S, V \in [0,1]$ $R', G', B' \in [0,1]$

If $S=0$, then $R'=G'=B'=V$
$S \neq 0$, then the following values are calculated
  $h = H/60$
  $i$ = integer part of $h$
  $f$ = fractional part of $h$
  $p = V(1-S)$
  $q = V(1-S \cdot f)$
  $t = V(1-S \cdot (1-f))$
and R', G', B' are determined by For $i = 0$  $(R', G', B') = (V, t, p)$
    $i = 1$  $(R', G', B') = (q, V, p)$
    $i = 2$  $(R', G', B') = (p, V, t)$
    $i = 3$  $(R', G', B') = (p, q, V)$
    $i = 4$  $(R', G', B') = (t, p, V)$
    $i = 5$  $(R', G', B') = (V, p, q)$ Note that these equations also yield $R'=G'=B'=0$ where $S=0$, because $p=q=t=V$ where $S=0$.

Additionally, it is possible to similarly implement any other color space, such as the CIE standard. All that is required is a set of equations for changing a selected color in the other color space into equivalent signals R', G' and B'.

The "Color Space" button is used to switch to another color space, for example, to switch from the HSV domain back to the RGB color space. It may also be used to switch to any other color space which is implemented in the system, such as the CIE standard mentioned above.

Thus, the user is able to effectively modify the transfer functions the color space by selecting a desired color from a color wheel and automatically changing a selected color in the video signal to match the selected color.

From the above description, it will be apparent that the invention disclosed herein provides a novel and advantageous apparatus for color correcting a color video signal either by transforming the inputs of all three complementary components of the signal, i.e. the entire color space, or by altering the transfer function of any one of the components, or even by altering the transfer function for only some inputs of one of the components.

The foregoing discussion discloses and describes merely exemplary methods and embodiments of the present invention. As will be understood by those familiar with the art, the invention may be embodied in other specific forms without departing from the spirit or essential characteristics thereof. For example, the default transfer function may be changed, the means for altering the look-up table may be different, or another type of interpolation may be used. Accordingly, the disclosure of the present invention is intended to be illustrative, but not limiting, of the scope of the invention, which is set forth in the following claims.

What is claimed is:

1. A digital color corrector for correcting a color video signal representing a portion of a colored optical image thereby generating a corrected output video signal, said color video signal including a first color component signal, a second color component signal, and a third color component signal, said corrected output video signal including a first corrected color component signal, a second corrected color component signal, and a third corrected color component signal, said digital color corrector comprising:

correction circuitry for producing the corrected output video signal from the color video signal by processing the first color component signal in accordance with a first transfer function, the second color component signal in accordance with a second transfer function, and the third color component signal in accordance with a third transfer function; and control means for controlling the correction circuitry to modify all three of the first transfer function, the second transfer function, and the third transfer function, in response to a command specifying conversion of pixels, of the color video signal, whose color component signal values determine a first color to corrected pixels, whose color component signal values determine a second color, thereby causing the correction circuitry to operate in a mode converting each pixel of the color video signal whose color component signal values determine the first color into a corrected pixel of the corrected output video signal whose color component signal values determine the second color, wherein the control means comprises limited modification means for modifying the first transfer function only for a selected range of values of the first transfer function, wherein the first color is determined by a first value of the first color component signal, a first value of the second color component signal, and a first value of the third color component signal, wherein the first value of the first color component signal is in the selected range, and wherein the limited modification means comprises:

means for changing the first transfer function for said first value in said selected range in response to said command; and means for interpolating the first transfer function for values in said selected range other than the first value in response to said command.

2. The digital color corrector of claim 1, wherein the limited modification means includes interpolation means for modifying the second transfer function by interpolation over a second limited range of values including the first value of the second color component signal in response to the command, and modifying the third transfer function by interpolation over a third limited range of values including the first value of the third color component signal in response to the command.

3. A method for correcting a color video signal including a first color component signal, a second color component signal, and a third color component signal, by converting pixels, of the color video signal, whose color component signal values determine a first color, to corrected pixels whose color component signal values determine a second color, said method including the steps of:

(a) processing the first color component signal in correction circuitry in accordance with a first transfer function to generate a first corrected color component signal, processing the second color component signal in the correction circuitry in accordance with a second transfer function to generate a second corrected color component signal, and processing the third color component signal in the correction circuitry in accordance with a third transfer function to generate a third corrected color component signal;

(b) before performing step (a), controlling the correction circuitry in response to a control signal by automatically modifying all of the first transfer function, the second transfer function, and the third transfer function to cause the correction circuitry to operate in a mode converting each pixel of the color video signal whose color component signal values determine the first color into a corrected pixel of the corrected output video signal whose color component signal values determine the second color, wherein the first color is determined by a first value of the first color component signal, a second value of the second color component signal, and a third value of the third color component signal, and wherein said automatic modification of the first transfer function includes interpolation of values of the first transfer function in a limited selected range including said first value, in response to said control signal; and (c) before step (b), generating the control signal in a manner so that said control signal is indicative of data determining the first color and the second color.

4. The method of claim 3, wherein the first color component signal is a red component signal, the second color component signal is a green component signal, and the third color component signal is a blue component signal, wherein step (c) includes the steps of:

selecting hue, saturation, and value parameters that determine the second color;

converting said hue, saturation and value parameters into red, green, and blue parameters that determine said second color.

5. A method for correcting a color video signal, said color video signal representing pixels of a color image and comprising a first color component signal, a second color component signal, and a third color component signal, by converting those of the pixels, whose color component signal values determine a first color, to corrected pixels, whose color component signal values determine a second color, said method including the steps of:

(a) generating a control signal specifying the first color and the second color, said first color determined by a first value of the first color component signal, a second value of the second color component signal, and a third value of the third color component signal, and said second color determined by a fourth value of the first color component signal, a fifth value of the second color component signal, and a sixth value of the third color component signal;

(b) in response to the control signal, supplying first transfer function data to a first color component correction circuit, second transfer function data to a second color component correction circuit, and third transfer function data to a third color component correction circuit, to cause said first, second, and third color component correction circuit, respectively, to implement a first transfer function, a second transfer function, and a third transfer function, wherein the first transfer function data include:

data specifying replacement of said first value with said fourth value; and data specifying replacement of values of the first color component signal other than said first value, but in a selected range including said first value, with interpolated values; and (c) processing the first color component signal in the first color component correction circuit to generate a first corrected color component signal, processing the second color component signal in the second color component correction circuit to generate a second corrected color component signal, and processing the third color component signal in the third color correction circuit to generate a third corrected color component signal, wherein the first corrected color component signal, the second corrected color component signal, and the third corrected color component signal, determine said corrected pixels.

6. The method of claim 5, wherein step (a) includes the step of matching displayed ones of the pixels, whose color component signal values determine said first color to displayed reference pixels, whose color component signal values determine said second color.

7. The method of claim 5, wherein step (a) includes the steps of:

displaying a color wheel icon including a displayed reference color, where the displayed reference color is determined by hue, saturation, and value parameters of the color wheel icon;

setting the hue, saturation, and value parameters to selected values that determine the second color; and processing the selected values of the hue, saturation and value parameters to convert said selected values of the hue, saturation and value parameters into red, green, and blue parameters of the control signal.

8. A system for correcting a color video signal, said color video signal representing pixels of a color image and comprising a first color component signal, a second color component signal, and a third color component signal, by converting those of the pixels, whose color component signal values determine a first color to corrected pixels, whose color component signal values determine a second color, said system including:

means for generating a control signal specifying the first color and the second color, said first color determined by a first value of the first color component signal, a second value of the second color component signal, and a third value of the third color component signal, and said second color determined by a fourth value of the first color component signal, a fifth value of the second color component signal, and a sixth value of the third color component signal;

a first color component correction circuit, including means for processing the first color component signal to generate a first corrected color component signal;

a second color component correction circuit, including means for processing the second color component signal to generate a second corrected color component signal;

a third color component correction circuit, including means for processing the third color component signal to generate a third corrected color component signal, wherein the first corrected color component signal, the second corrected color component signal, and the third corrected color component signal determine said corrected pixels;

means for supplying first transfer function data to the first color component correction circuit, second transfer function data to the second color component correction circuit, and third transfer function data to the third color component correction circuit in response to the control signal, to cause said first, second, and third color component correction circuit, respectively, to process the first color component signal in accordance with a first transfer function, to process the second color component signal in accordance with a second transfer function, and to process the third color component signal in accordance with a third transfer function, wherein the first transfer function data include:

data specifying replacement of said first value with said fourth value; and data specifying replacement of values of the first color component signal other than said first value, but in a selected range including said first value, with interpolated values.

9. The system of claim 8, wherein the means for generating the control signal includes:

means for matching displayed ones of the pixels, whose color component signal values determine said first color to displayed reference pixels, whose color component signal values determine said second color.

* * * * *